US012753855B2

(12) United States Patent
Crichton

(10) Patent No.: US 12,753,855 B2
(45) Date of Patent: Oct. 6, 2026

(54) VALVE LIFT ARM

(71) Applicant: APEX VALVES LIMITED, Avondale (NZ)

(72) Inventor: David Gordon Arthur Crichton, Waitoki (NZ)

(73) Assignee: APEX VALVES LIMITED, Avondale (NZ)

( * ) Notice: Subject to any disclaimer, the term of this patent is extended or adjusted under 35 U.S.C. 154(b) by 0 days.

(21) Appl. No.: 18/845,319

(22) PCT Filed: Feb. 22, 2023

(86) PCT No.: PCT/NZ2023/050024
§ 371 (c)(1),
(2) Date: Sep. 9, 2024

(87) PCT Pub. No.: WO2023/172147
PCT Pub. Date: Sep. 14, 2023

(65) Prior Publication Data

US 2025/0198535 A1 Jun. 19, 2025

(30) Foreign Application Priority Data

Mar. 9, 2022 (NZ) ........................................ 785982

(51) Int. Cl.
*F16K 31/26* (2006.01)

(52) U.S. Cl.
CPC .................................... *F16K 31/26* (2013.01)

(58) Field of Classification Search
CPC ............................... F16K 31/26; F16K 31/265
See application file for complete search history.

(56) References Cited

U.S. PATENT DOCUMENTS 540,713 A 6/1895 Blackwood
741,343 A * 10/1903 Keddington ............ F16K 31/26
137/445

(Continued)

FOREIGN PATENT DOCUMENTS

AU 2013100024 A4 2/2013
AU 2012216270 A1 4/2013

(Continued)

OTHER PUBLICATIONS

International Search Report and Written Opinion dated May 19, 2023 in corresponding International Application No. PCT/NZ2023/050024, 14 pages.

*Primary Examiner* — Hailey K. Do
(74) *Attorney, Agent, or Firm* — MH2 Technology Law Group LLP

(57) ABSTRACT

In one aspect the disclosure provides a valve lift arm which includes a main body defining an arm structure for a valve, and a trigger engagement structure defined at one end of the main body. Also provided is a valve engagement structure defined at the distal end of the main body to the trigger engagement structure, with the valve engagement structure providing a vertical pivot connection to the valve and facilitating operation of the valve through vertical motion of the end of the main body. A pivot structure is provided which divides the main body into a valve part which incorporates the valve engagement structure and a trigger part which incorporates the trigger engagement structure. The pivot structure includes an axle which allows rotational motion of the trigger part relative to the valve part, the allowed rotational motion having a horizontal or lateral component.

14 Claims, 6 Drawing Sheets

(56) References Cited

U.S. PATENT DOCUMENTS

| | | | | | |
|---|---|---|---|---|---|
| 756,538 | A * | 4/1904 | Smith | | F16K 31/26 137/445 |
| 2,067,836 | A | 1/1937 | Foulds | | |
| 2,614,532 | A | 10/1952 | Steel | | |
| 2,741,774 | A | 4/1956 | Gibbons | | |
| 3,385,317 | A | 5/1968 | Yankers | | |
| 4,335,741 | A | 6/1982 | Nasser | | |
| 2009/0151796 | A1 | 6/2009 | Buchtel | | |

FOREIGN PATENT DOCUMENTS

| | | | | |
|---|---|---|---|---|
| AU | 2021221382 | A1 | 11/2022 | |
| CN | 103940124 | B | 8/2015 | |
| GB | 160949 | A * | 4/1921 | F16K 31/26 |
| NZ | 787925 | A1 | 11/2022 | |
| WO | 2020163898 | A1 | 8/2020 | |

* cited by examiner

Figure 1a
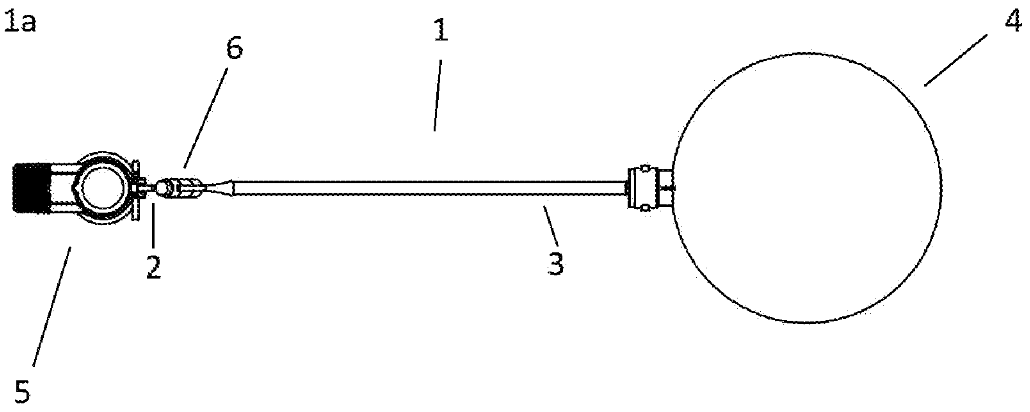
Figure 1b
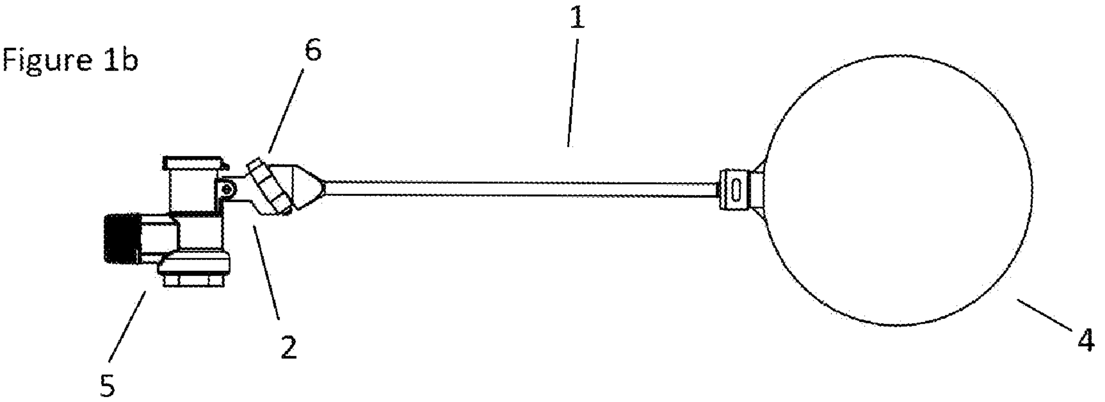
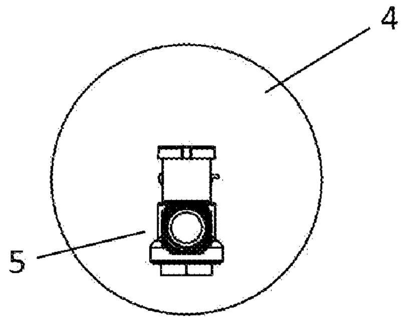
Figure 1c

VALVE LIFT ARM

CROSS-REFERENCE TO RELATED APPLICATIONS

This application is a U.S. National Stage of International Patent Application No. PCT/NZ2023/050024, filed on 22 Feb. 2023, pending, and claims priority to New Zealand Patent Application No. 785982, filed on 9 Mar. 2022, both of which are incorporated herein by reference in their entireties.

FIELD OF THE DISCLOSURE

This disclosure relates to an improved valve lift arm. A lift arm according to the present disclosure can minimise the likelihood of livestock damaging the lift arm and an associated float valve when deployed with a watering trough.

BACKGROUND OF THE DISCLOSURE

A number of liquid flow control valves employ lift arms in their operation. One end of the lift arm moves up and down to engage with and actuate internal components of the valve, while the other end of the arm is subject to an external force. A pivoting connection of the arm to the valve located between the ends of the arm results in a substantially vertical reciprocating motion of the two ends of the arm. The external force applied to control the operation of the valve can be provided by—for example—a weight or a float system attached to the free end of the arm.

For example, float valves are used extensively in combination with livestock watering troughs. Float valves are operated by a lift arm engaged at one end with the valve and at its opposite end with a float sitting in a body of water. The lift arm is connected to the valve housing with a pivoting connection so that the terminal end of the arm can move up and down to act as a cam or trigger on internal components of the float valve. As water levels drop the float end of the arm will also drop, pivoting the opposite valve end of the arm upwards and triggering the opening of the float valve. Rising water levels will have the opposite effect, dropping the valve end of the lift arm and closing the float valve.

Existing float valves are generally configured so that if the lift arm has a horizontal orientation the float valve will be entirely closed. As the lift arm makes an increasingly larger declining angle with the horizontal plane the float valve will open to a greater extent. This configuration therefore regulates water flow rates through the float valve with high flow rates only being enabled when a relatively large volume of water needs to be supplied.

Float valves of this form work well in isolation but are susceptible to damage when exposed to livestock. Cattle in particular are large animals and when several crowd around a trough they can apply enough force to the lift arm to bend or break it.

Existing lift arms are able to move with forces which have only a vertical component as the vertical pivot connecting the lift arm to the valve allows the arm and connected float to sink down into the trough. However damaging forces applied by livestock invariably are a combination of both vertical and horizontal or lateral forces, where these lateral forces will be resisted by the float arm and can cause it to bend or break. This issue is present in both float valves and other types of valves which are operated in combination with a lift arm.

It would therefore be of advantage to have improvements in the field of valve lift arms which minimised the likelihood of damage by livestock or other causes, or which at least provided the public with an alternative choice to the prior art.

SUMMARY OF THE DISCLOSURE

According to one aspect of the present disclosure there is provided a valve lift arm which includes

- a main body defining an arm structure for a valve,
- a trigger engagement structure defined at one end of the main body,
- a valve engagement structure defined at the distal end of the main body to the trigger engagement structure,
- the valve engagement structure providing a vertical pivot connection to the valve and facilitating operation of the valve through vertical motion of the end of the main body,
- a pivot structure which divides the main body into a valve part which incorporates the valve engagement structure and a trigger part which incorporates the trigger engagement structure,
- the pivot structure including an axle which allows rotational motion of the trigger part relative to the valve part, the allowed rotational motion having a horizontal or lateral component.

According to a further aspect of the disclosure there is provided a valve lift arm substantially as described above wherein the axle of the pivot structure is angled relative to the horizontal plane when the valve part has a horizontal orientation to allow rotation motion with both a vertical and a horizontal or lateral component.

According to another aspect of the disclosure there is provided a valve assembly comprising

- a valve,
- a valve lift arm including,
- a main body having,
- a trigger part including a trigger engagement structure defined at one end of the main body,
- a valve part including a valve engagement structure defined at a second end of the main body, the valve engagement structure providing a vertical pivot connection to the valve and facilitating operation of the valve through vertical motion of the end of the main body,
- a hinge connecting the trigger part to the valve part,
- a float connected to the trigger engagement structure of the valve lift arm.

According to yet another aspect of the disclosure there is provided a valve assemble substantially as described above wherein the valve part is shorter than the trigger part.

The present disclosure provides a valve lift arm and a valve assembly which integrates this valve lift arm. Reference throughout this specification will be made to the lift arm being engaged with a float valve used to supply water to a livestock watering trough. In such embodiments the trigger engagement structure can be used to connect a float to one end of the main body. Those skilled in the art will however appreciate that the a lift arm according to the present disclosure may be engaged with other types of valves used with lift arms in other applications if desirable.

The exemplary embodiment of the lift arm provided herein is used in a similar manner to prior art lift arms, also having a main body which defines an arm structure, one end of this main body being engaged with a trigger element such as a float or a weight, and the opposite end being engaged with the associated valve.

Those skilled in the art will appreciate that any applicable type of prior art trigger connection mechanism or structure may be used to define a trigger engagement structure at one end of this main body. For example, in exemplary embodiments the end of the main body to be engaged with a float may have a trigger engagement structure defined by a thread formed in the end of the main body. This thread can allow a float to be screwed on to the end of the main body. In other embodiments a trigger engagement structure may be provided by an eyelet or aperture formed in the end of the main body which allows for suspension of a trigger weight. Again, those skilled in the art should appreciate that other types of trigger connection systems are also within the scope of the disclosure.

Similarly, the disclosure may also incorporate any applicable type of prior art valve engagement structure which can be used to connect the opposite end of the main body to an associated valve. For example in exemplary embodiments a valve engagement structure can be provided by a locating pin extending through a portion of the main body adjacent to one of its ends where the main body may pivot around the axis of the pin to impart vertical motion to the adjacent end of the main body. In such exemplary embodiments the terminal end of the main body adjacent to this locating pin can have a form or shape which facilitates triggering of internal parts of the valve as the end of the main body moves up and down. Again, however those skilled in the art should appreciate that other types of valve engagement structures are also within the scope of the disclosure.

The present disclosure incorporates a pivot structure which divides the main body of the lift arm into two distinct parts. This pivot structure can be disposed between a valve part of the lift arm which incorporates the valve engagement structure and a trigger part of the lift arm which incorporates the trigger engagement structure.

The disclosure's use of a pivot structure allows these two parts to rotate or pivot relative to one another. This rotational motion is allowed through the incorporation of an axle within the pivot structure. Complimentary parts of the pivot structure associated with each of the valve and trigger parts can bear against and rotate relative to this axle, with the orientation and positioning of the axle allowing for rotational motion having a horizontal or lateral component.

In an exemplary embodiment, the axle of the pivot structure is angled relative to the horizontal plane when the valve part has a horizontal orientation. This allows rotation motion with both a vertical and a horizontal or lateral component. For example in various exemplary embodiments the axle incorporated into the pivot structure may be angled with respect to a horizontal plane when the valve part has a horizontal orientation, this horizontal plane being orthogonal to the vertical plane of motion allowed by the connection between the valve engagement structure and the associated valve.

This declined or depressed angling of the axle allows rotations of the trigger part that ensure it does not resist lateral forces applied by livestock or other sources. When a lift arm according to the present disclosure is used with a float valve, the trigger part can move downwards and laterally with these forces to sink the associated float. Furthermore, this arrangement provides the lift arm with a self-centred character, with buoyancy forces acting to reposition the lift arm and float directly back directly in front of the float valve in the absence of any forces applied by livestock. This characteristic ensures that the lift arm will return to a position which allows normal operation of the valve through unimpeded vertical motion of the end of the valve engagement structure.

In exemplary embodiments the axle of the pivot structure may decline from the horizontal plane at an angle ranging between 20°-45°. In further exemplary embodiments the axle of the pivot structure may decline from the horizontal plane at an angle of approximately 35°.

In an exemplary embodiment a pivot structure may be formed by a hinge with bearing knuckles defined at the end of each of the valve and trigger parts which engage with the axle. These bearing knuckles may be orientated at the same angle as the axle to allow the desired rotational motion having both a vertical and a horizontal component.

The present disclosure may provide potential advantages over the prior art.

In various embodiments the disclosure provides a valve lift arm which allows a portion of the arm and a connected trigger such as a float or weight to move laterally under a force applied by livestock or other sources. When used with a float valve, a lift arm according to the present disclosure allows a float to be submerged and moved laterally, then returned to its original centred position in front of the valve.

BRIEF DESCRIPTION OF THE DRAWINGS

Additional and further aspects of the present disclosure will be apparent to the reader from the following description of embodiments, given in by way of example only, with reference to the accompanying drawings in which:

FIGS. 1*a*, 1*b* and 1*c* show top, side and end views of a float, float valve and lift arm as provided in accordance with an exemplary embodiment.

Further aspects of the disclosure will become apparent from the following description of the disclosure which is given by way of example only of particular embodiments.

BEST MODES FOR CARRYING OUT THE DISCLOSURE

Figure 2:
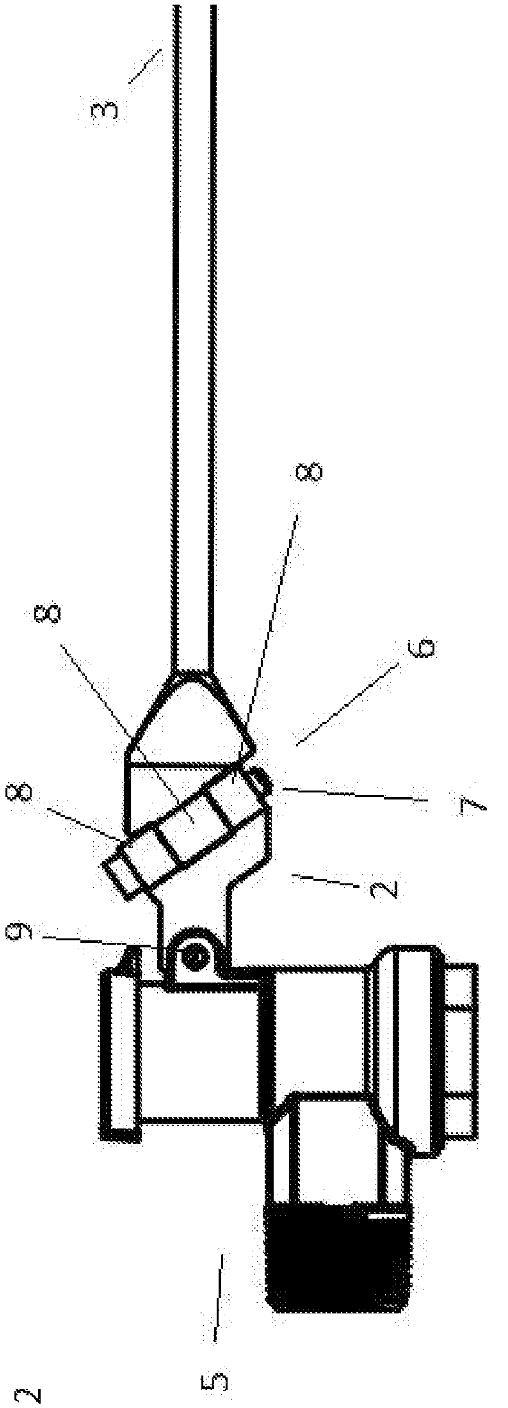
FIG. 2 shows an enlarged side view of the valve end of the lift arm shown with respect to FIG. 1*b*, FIGS. 3*a*, 3*b* and 3*c* show top, side and end views of a float, float valve and lift arm of FIGS. 1*a*, 1*b* and 1*c* when experiencing an external force with a horizontal component.

FIGS. 1 through 3 show various views of a valve lift arm 1 provided in accordance with an exemplary embodiment of the disclosure. The lift arm 1 is formed by a main body defining an arm structure which forms a valve part 2 and a trigger part 3.

The trigger part 3 is connected to a float 4 by a trigger engagement structure formed by a thread (not shown) defined at the float end of the trigger part. The valve part 2 is connected to a float valve 5 by a valve engagement structure, portions of which being shown in further detail with respect to FIG. 2. The main body is divided into the valve part and trigger part by a pivot structure 6, also shown in further detail by FIG. 2.

As can be seen from FIG. 2 the valve engagement structure includes a locating pivot pin 9 extending through the valve part and secured by the housing of the float valve 5. This pin provides a vertical pivot connection to the float valve and allows vertical motion of the terminal end of the valve part as the opposite end of the trigger part moves with the water level of a water trough (not shown). This vertical motion of the end of the valve part operates the float valve by applying a vertical force to internal parts of the valve.

FIG. 2 also shows further details of the pivot structure 6 which includes an axle 7 to allow rotational motion of the trigger part relative to the valve part. As can be seen from the figures provided the axle 7 is angled relative to the horizontal plane when the valve part has the horizontal orientation shown with respect to FIGS. 1*a*, 1*b* and 1*c*. This declining angle of the axle allows rotational motion of the trigger part which has a horizontal or lateral component.

In the embodiment shown the pivot structure 6 has a hinge configuration with bearing knuckles 8 defined at each respective end of the valve and trigger parts. These knuckles have a complimentary form to the axle and bear against it to provide the rotational motion allowed by the pivot structure.

Figure 3A:
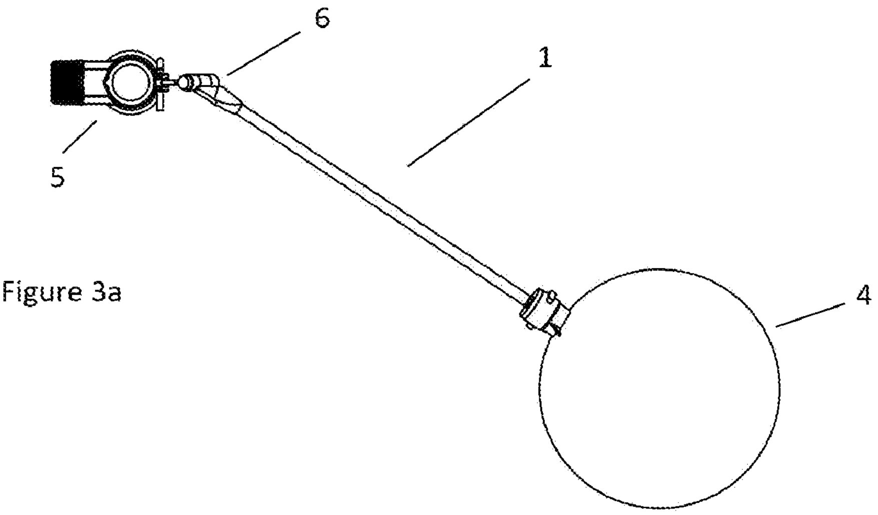
Figure 3B:
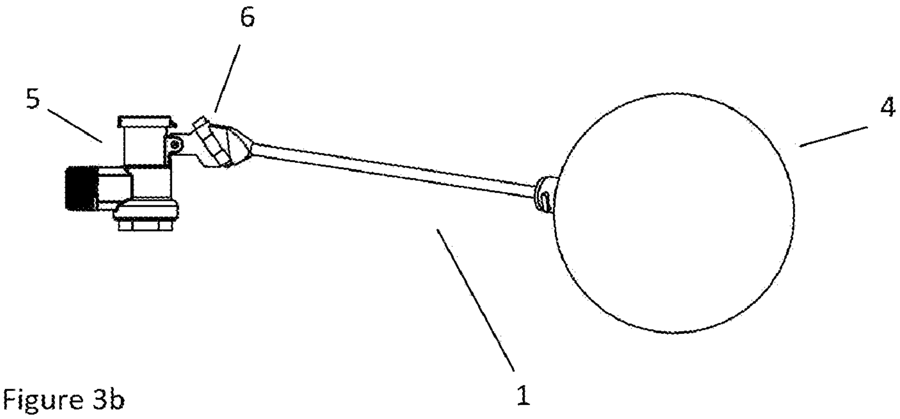
Figure 3C:
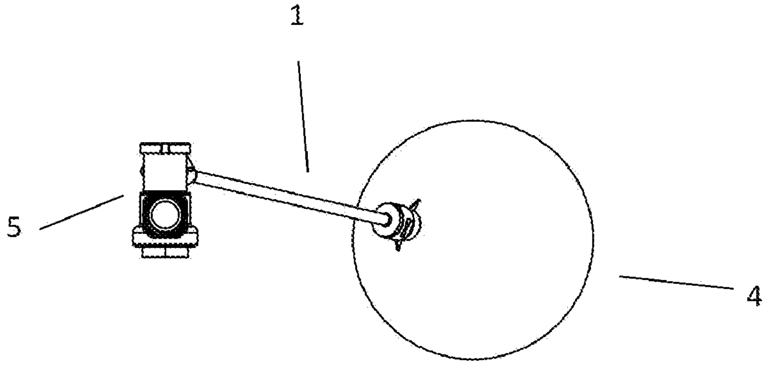

The rotational motion permitted by the pivot structure is shown more clearly with respect to FIGS. 3*a*, 3*b* and 3*c*. As can be seen from these figures the application of a horizontal force to the float or lift arm will not be resisted, but instead will result in the float and arm moving both laterally and downwards. Once this force is removed the buoyancy of the float will cause it and the float end of the arm to rise upwards and to re-centre the float directly in from of the float valve, as shown with respect to FIGS. 1*a*, 1*b* and 1*c*.

Figure 4:
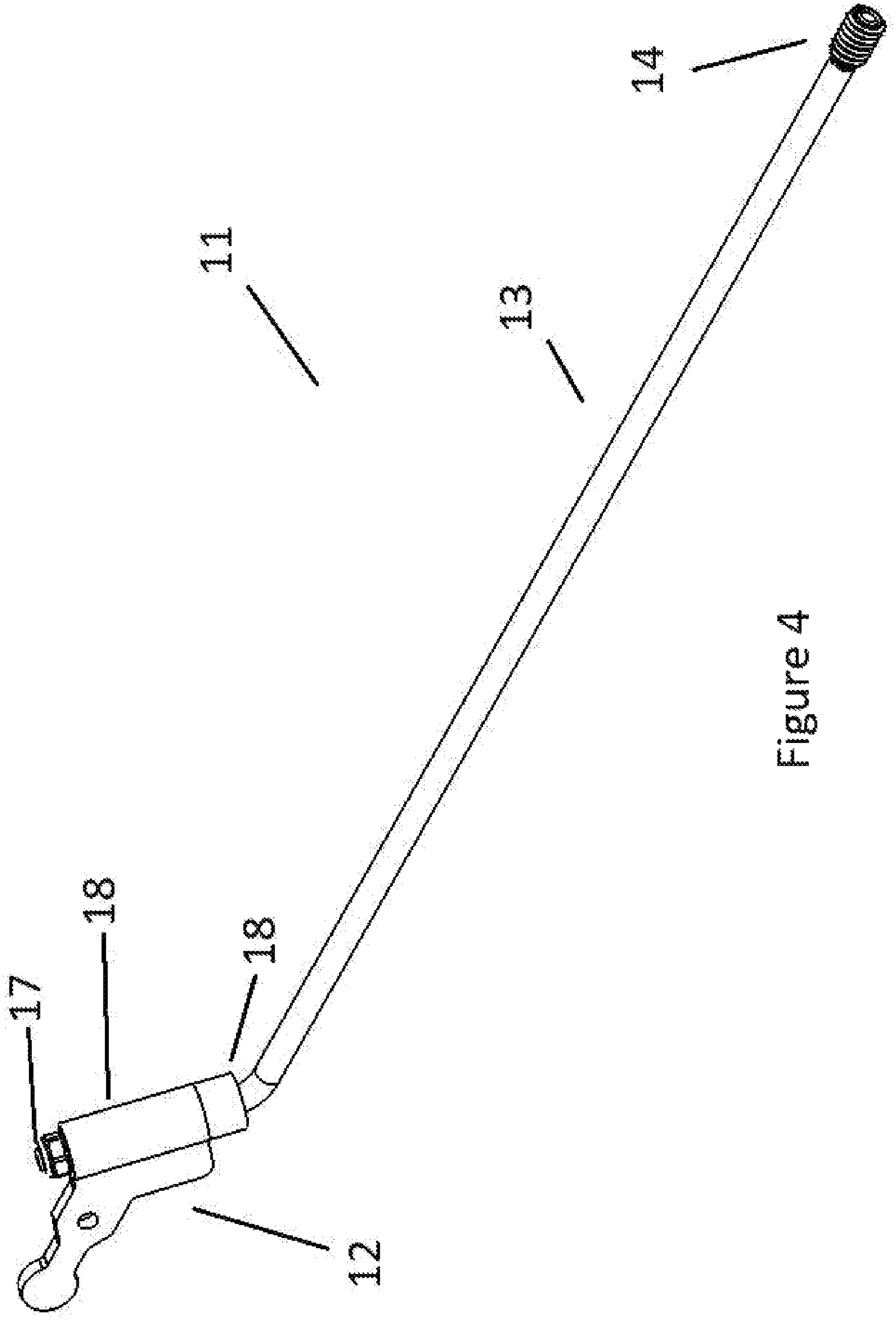
FIG. 4 shows a perspective view of a lift arm provided in accordance with a further embodiment implemented with a different form of pivot structure to that shown with respect to FIGS. 1-3.
Figure 5:
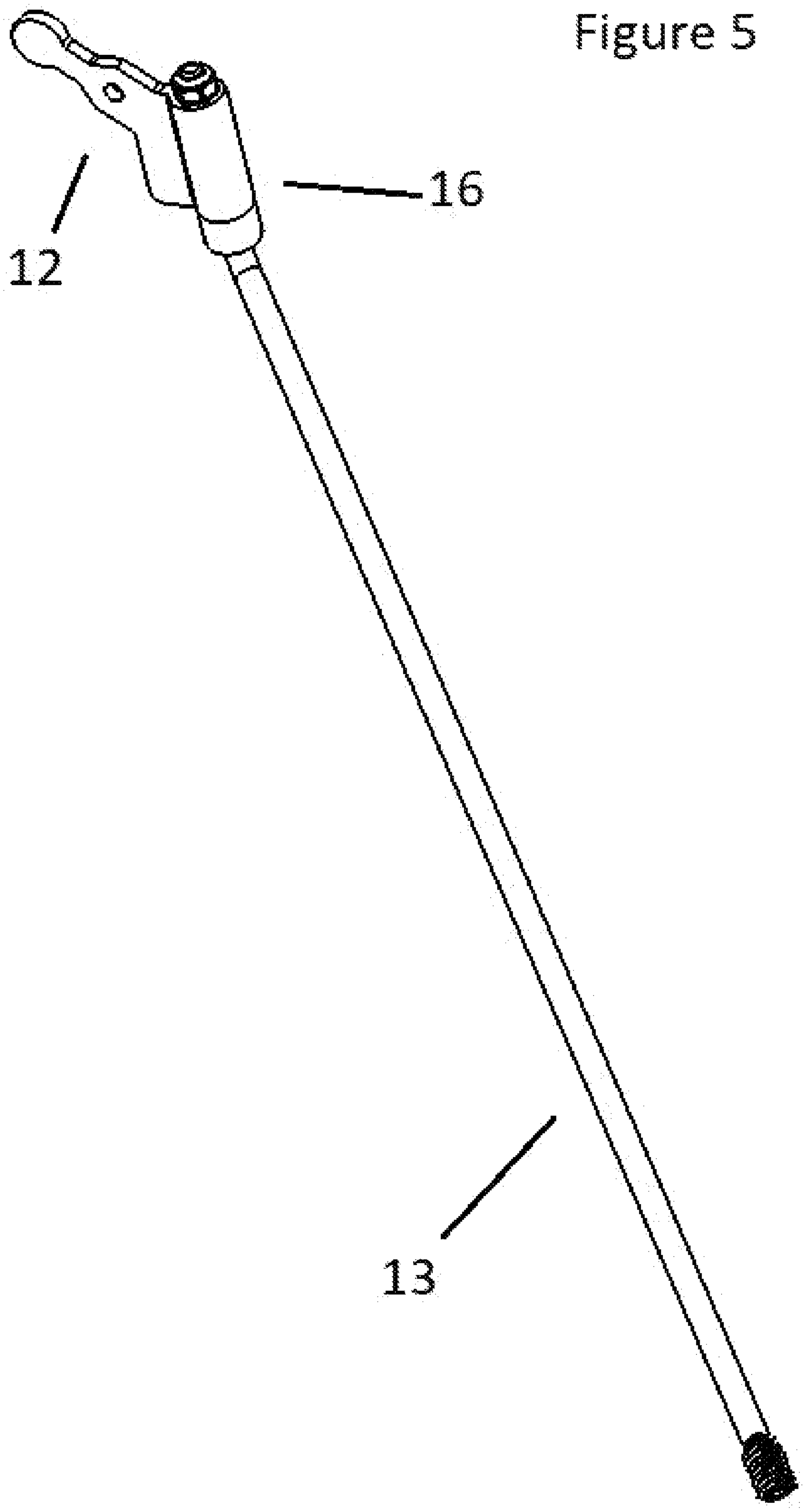
FIG. 5 shows the operation of the pivot structure integrated into the lift arm of FIG. 4.

FIG. 4 shows a perspective view of a lift arm provided in accordance with a further embodiment implemented with a different form of pivot structure to that shown with respect to FIGS. 1-3. FIG. 5 shows the operation of this pivot structure when used to allow rotational motion with a lateral component.

Similar to the embodiment shown with respect to FIGS. 1-3, the lift arm 11 of FIG. 4 also includes a valve part 12 used to engage with a valve (not shown), and trigger part 13 used to engage with a triggering float or weight using a trigger engagement thread 14.

The lift arm 11 defines a pivot structure 16 which includes an internal axle 17 engaged with a single knuckle 18 formed on the ends of each of the valve and trigger parts. These two knuckles 18 surround the axle and abut one another as shown by FIG. 4. The operation of this arrangement is illustrated by FIG. 5, where the trigger part 13 has been rotated and deviated laterally relative to the valve part 12.

Figure 6:
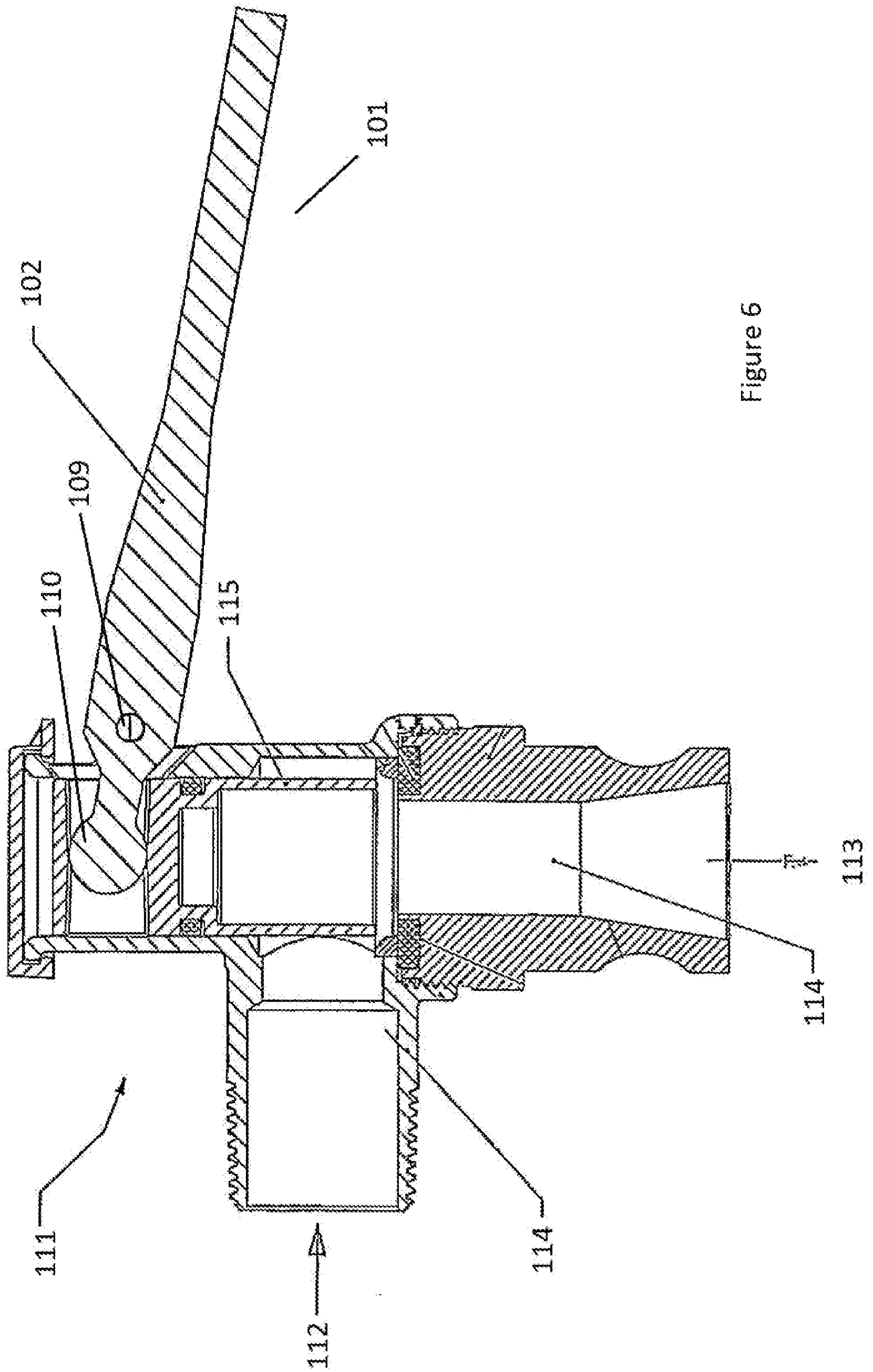
FIG. 6 shows a side cross section view of portions of a valve lift arm as provided in a yet further embodiment when engaged with a prior art float control valve.

FIG. 6 shows a side cross section view of portions of a valve lift arm 101 as provided in a yet further embodiment when engaged with a prior art float control valve 111.

This figure shows the valve part 102 of the lift arm 101 which includes a valve engagement structure provided by a locating pin 109. This locating pin 109 allows the terminal end 110 of the valve part adjacent to the locating pin to move up and down vertically inside the upper housing of the float control valve.

The float control valve 111 defines an inlet 112 outlet 113, internal passage providing a channel between the inlet and the outlet 114, and flow control plunger 115 arranged to move up and down inside the valve to open or close the internal passage. The terminal end 110 of the valve part is defined with a cam structure which facilitates triggering of the flow control plunger 115 of the valve as the end of the valve part moves up and down.

In the configuration shown with respect to FIG. 6 a float (not shown) engaged with the distal end of the valve lift arm 101 allows the lift arm to decline, raising the terminal cam shaped end 110 of the valve part. This arrangement positions the plunger 115 to open the valve's internal passage 114 and allow liquid to flow from the inlet 112 to the outlet 113. Rising liquid levels will then lift the float, placing the lift arm 101 in a level or inclined orientation, lowering the terminal cam shaped end 110 of the valve part. In this arrangement the terminal cam shaped end of the valve part will bear downwards against the plunger 115, forcing it into a position which closes the internal passage 114.

In the preceding description and the following claims the word "comprise" or equivalent variations thereof is used in an inclusive sense to specify the presence of the stated feature or features. This term does not preclude the presence or addition of further features in various embodiments.

It is to be understood that the present disclosure is not limited to the exemplary embodiments described herein and further and additional embodiments within the spirit and scope of the disclosure will be apparent to the skilled reader from the examples illustrated with reference to the drawings. In particular, the disclosure may reside in any combination of features described herein, or may reside in alternative embodiments or combinations of these features with known equivalents to given features. Modifications and variations of the example embodiments of the disclosure discussed above will be apparent to those skilled in the art and may be made without departure of the scope of the disclosure as defined in the appended claims.

What is claimed is:

1. A valve lift arm comprising:

a main body defining an arm structure for a valve, a trigger engagement structure defined at one end of the main body, a valve engagement structure defined at a distal end of the main body to the trigger engagement structure, the valve engagement structure providing a vertical pivot connection to the valve and facilitating operation of the valve through vertical motion of the distal end of the main body, a pivot structure which divides the main body into a valve part which incorporates the valve engagement structure and a trigger part which incorporates the trigger engagement structure, the pivot structure including an axle which allows rotational motion of the trigger part relative to the valve part, the allowed rotational motion having a horizontal or lateral component, and wherein the axle of the pivot structure is angled at an angle ranging between 20°-45° relative to a horizontal plane when the valve part has a horizontal orientation.

2. The valve lift arm as claimed in claim 1, wherein the axle of the pivot structure is angled at an angle of approximately 35°.

3. The valve lift arm as claimed in claim 1, which is engaged with a weight used to trigger the opening of the valve.

4. The valve lift arm as claimed in claim 1, wherein the trigger engagement structure is defined by a thread formed in the one end of the main body.

5. The valve lift arm as claimed in claim 1, wherein the trigger engagement structure is provided by an aperture formed in the one end of the main body which allows for suspension of a trigger weight.

6. The valve lift arm as claimed in claim 1, which is engaged with a float valve used to supply water to a livestock watering trough.

7. The valve lift arm as claimed in claim 6, wherein the lift arm exhibits a self-centred character, with buoyancy forces acting to position the lift arm and float directly in front of the float valve.

8. The valve lift arm as claimed in claim 1, wherein the pivot structure is formed by a hinge with bearing knuckles defined at an end of each of the valve and trigger parts which engage with the axle.

9. The valve lift arm as claimed in claim 8, wherein the bearing knuckles are orientated at the same angle as the axle to allow the desired rotational motion having both a vertical and a horizontal component.

10. The valve lift arm as claimed in claim 1, wherein the valve engagement structure is provided by a locating pin extending through a portion of the main body adjacent to one of its ends and the main body may pivot around the axis of the pin to impart vertical motion to the adjacent end of the main body.

11. The valve lift arm as claimed in claim 10, wherein a terminal end of the main body adjacent to the locating pin is shaped to trigger internal parts of the valve as the one end of the main body moves up and down.

12. A valve assembly comprising:
a valve,
a valve lift arm including,
a main body having,
a trigger part including a trigger engagement structure defined at one end of the main body,
a valve part including a valve engagement structure defined at a second end of the main body, the valve engagement structure providing a vertical pivot connection to the valve and facilitating operation of the valve through vertical motion of the one end of the main body, and
a hinge connecting the trigger part to the valve part, wherein the hinge includes an axle angled at an angle ranging between 20°-45° relative to the horizontal plane when the valve part has a horizontal orientation, and a float connected to the trigger engagement structure of the valve lift arm.

13. The valve assembly as claimed in claim 12, wherein the hinge includes bearing knuckles defined at the end of each of the valve and trigger parts with the axle pivotally connecting the bearing knuckles.

14. The valve assembly as claimed in claim 12, wherein the valve part is shorter than the trigger part.

* * * * *